United States Patent [19]

Cortès

[11] 4,345,798
[45] Aug. 24, 1982

[54] REDUCTION IN WEAR OF CONTACTING SURFACES

[75] Inventor: Abel C. Cortès, Le Perray en Yvelines, France

[73] Assignee: Compagnie Francaise des Petroles, Paris, France

[21] Appl. No.: 258,258

[22] Filed: Apr. 28, 1981

Related U.S. Application Data

[63] Continuation of Ser. No. 66,104, Aug. 13, 1979, abandoned.

[30] Foreign Application Priority Data

Aug. 11, 1978 [FR] France .............................. 78 23809

[51] Int. Cl.³ .......................... F16C 17/04; F16C 33/24
[52] U.S. Cl. ...................................... 308/160; 308/76; 308/239; 308/241

[58] Field of Search ................... 308/160, 170, 77, 76, 308/241, 239, 8.2; 175/329

[56] References Cited

U.S. PATENT DOCUMENTS

| 3,095,053 | 6/1963 | Pistole et al. | 175/329 |
| 3,823,030 | 7/1974 | Hudson | 308/8.2 |
| 4,190,301 | 2/1980 | Lachonius et al. | 308/8.2 |

*Primary Examiner*—Lenard A. Footland
*Attorney, Agent, or Firm*—Sughrue, Mion, Zinn, Macpeak & Seas

[57] ABSTRACT

To reduce the wear of surfaces of anti-friction devices or bearings, the surfaces are diamonded, e.g. by being provided with diamonds or by being the surfaces of diamond-containing concretions, and are lapped before use, substantially no further wear occuring after the surfaces have been lapped.

10 Claims, 1 Drawing Figure

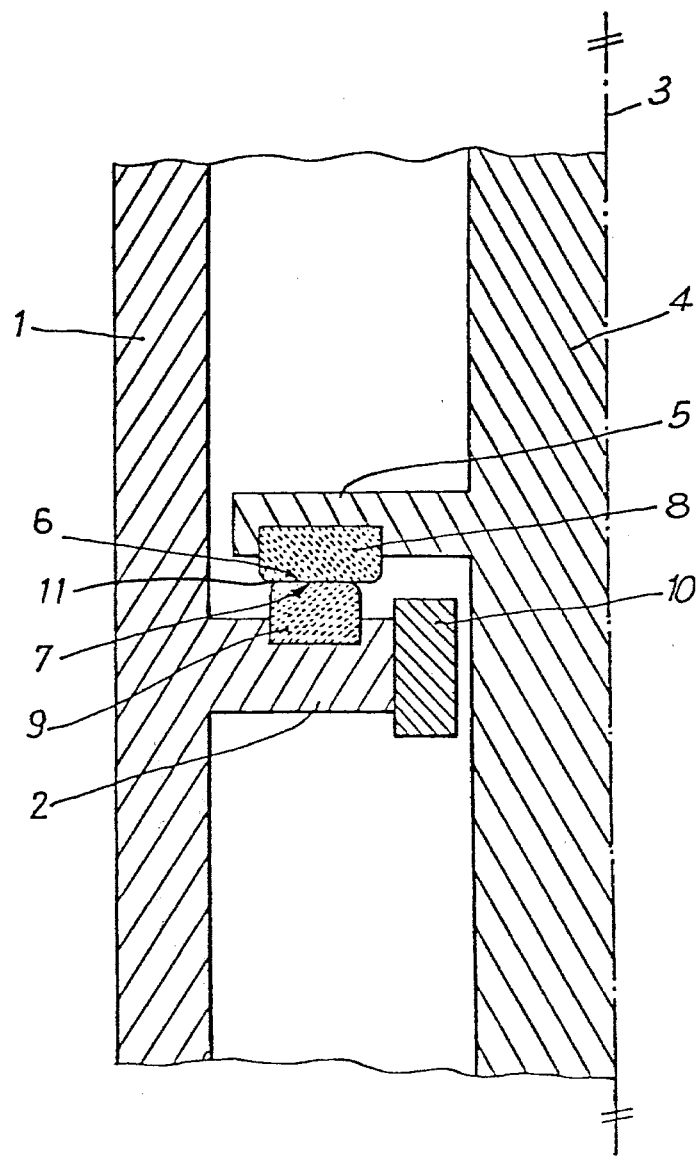

REDUCTION IN WEAR OF CONTACTING SURFACES

This is a Continuation of application Ser. No. 66,104, filed Aug. 13, 1979 (now abandoned).

The invention relates to means for reducing the wear of surfaces and to an anti-friction device for example for guiding or supporting two relatively moving components, regardless of their relative speed, and particularly but not exclusively for receiving the high axial thrusts of a drilling turbine rotor.

The very large number of known types of bearings do not make it possible to efficiently avoid wear of the components which are in contact. This wear must be avoided particularly when the bearings for example support the rotor of a drilling turbine. Such wear can in fact have grave consequences because of the resulting reduction in the play between the vanes of the stator and of the rotor, the elimination of this play leading to their destruction.

It is thus not possible to use solutions in which one of the components in contact is a wear component intended to be replaced, because this wear would result in the vanes coming closer together. Also known anti-friction coatings are only effective under well-defined conditions which do not correspond to the substantial loads which the drilling turbines have to withstand.

In order to avoid the disadvantage of smooth bearing surfaces, one can use roller bearings, but here again the conditions for effective use cannot always be maintained, since the roller bearings are attacked by the drilling sludge, and their leaktightness cannot be maintained.

The invention relates to a process which makes it possible to reduce the wear of the surfaces in contact virtually to zero over all temperatures and pressures outside those at which diamond is converted to graphite. According to one aspect of the invention there is provided a method of producing wear resistant surfaces to be in continuous or intermittent contact, comprising providing surfaces comprising diamonds and lapping the surfaces.

Preferably the surfaces are lapped against each other at least in the final stages of lapping.

Experience has shown that, regardless of the types of diamonded surfaces, which may be surfaces of diamond-containing concretions or of diamonds, used, after lapping the two surfaces against one another, an anti-friction device constituted by the surfaces not only resists high pressures and high speeds, but also shows virtually no wear once lapping has been completed.

Furthermore, experience has shown that it is possible not only to use a great variety of such smooth diamonded surfaces of identical compositions, but that the anti-friction device thus produced can be applied to all the known types of bearings, one of the surfaces playing the role of the actual bearing and the other surface sliding or rolling on the bearing surface. In particular, when the pressure stresses are high and the speed is high, it is possible to use a bearing consisting of a contact ring provided with a diamonded surface bearing on surfaces of shoes of the same nature as the ring, after lapping the diamonded surfaces which are in contact. This has the advantage that it is possible to reduce the temperature of the surfaces by circulating a cooling fluid between the shoes, so as to keep the conditions further away from the conditions under which diamond is transformed into graphite.

The invention also relates to the application of such diamonded surfaces, after lapping, to bearings of any type and especially to fluid bearings where the surfaces of the bearings are separated, at high speeds, by a liquid or gaseous fluid film, these various bearings each being connected with a diamonded surface which forms with the diamonded surface of the bearing, an anti-friction device which avoids all wear.

Extensive experiments with surfaces of diamond-containing concretions of various compositions proved such surfaces equally effective, regardless of whether the diamonds incorporated were of natural or artificial origin, and from the instant at which lapping has been completed.

It is thus possible to use rings of diamonds which serve as shoes on which a track or surface of a diamond-containing concretion bears.

An anti-friction device may thus comprise surfaces of which one is constituted by at least one track of a diamond-containing concretion, and of which another consists of a series of diamonds, the track having been lapped by the said diamonds.

All the types of diamonded surfaces, whether of diamond-containing concretions or of diamonds, used, whether of a similar nature or of a different nature, in respect of the compositions of the metal powders used or in respect of the sizes of the diamonds included in the diamond-containing concretions or the sizes of the diamonds used as shoes, have proved not to suffer from wear once the surfaces have been lapped together.

The invention is applicable to any anti-friction device and especially to all types of bearings, including thrust bearings, step-bearings and fluid-film bearings which serve to guide and support another diamonded surface permanently or intermittently.

An embodiment of the invention will now be described, by way of example only, with reference to the accompanying drawing.

In the drawing, the single FIGURE shows schematically an axial part-section of part of a stator and a rotor of a drilling turbine, including a bearing employing an embodiment of an anti-friction device according to the present invention.

The stator shown in the drawing comprises a cylindrical part 1 of which the axis 3 coincides with the axis of a central rotor 4. The rotor 4 includes a circular support 5 below which is fixed, or incorporated, a ring 8 made of a diamond-containing concretion. The lower surface 6 of the ring bears on the surfaces 7 of a series of shoes 9 fixed to the stator 1.

The shoes 9, made of a diamond-containing concretion identical to that of the ring 8, are fixed to, or incorporated in, an annular support 2 of the stator 1.

In this example, only the axial forces are high and therefore the bearing 10, mounted at the periphery of the support 2, can be of any type and may be a bearing having a diamonded surface which is lapped against a diamonded cylindrical surface of the rotor 4.

The composition of the ring 8 of diamond-containing concretion and of the shoes 9 may, for example, be one of the diamond-containing concretions used in drilling tools.

The surfaces 6 and 7 are lapped by, for example, rubbing the surfaces against one another until any detectable trace of wear has disappeared. It is in fact found, as has been explained above, that, as from the moment that lapping has been completed, wear ceases.

Though in general lapping is achieved more rapidly if the compositions of the concretions are identical and if the concretions contain diamonds of small particle size, it is possible to obtain lapped surfaces which do not wear further when the particle sizes are different and when the concretions correspond to different compositions.

In particular, in the application of the surfaces to the bearings of a drilling turbine, it is found that contrary to the destructive effect which the drilling sludge has on roller bearings when the drilling sludge is used as a cooling fluid, the sludge has no harmful effect on the diamonded friction surfaces. The sludge which circulates between the shoes 9 and the ring 8 only has the effect of cooling the surfaces 7, 6 of the shoes and ring. The fluid, in the form of a thin film, is illustrated at 11 in the drawing, as being between the opposed surfaces 6, 7. The absence of deterioration of the diamonded and lapped surfaces 6 and 7 is remarkable and is also one of the factors in the absence of wear.

Where it is desired to produce fluid bearings, one proceeds in the same manner to effect lapping of the diamonded surfaces of the cylindrical bearings and the diamonded surfaces of components which delimit the fluid films.

Even though only a single example of an anti-friction device, for a well-defined application, has been described, and even though the diamond-containing concretions commonly used in high-output drilling tools have been mentioned as examples of diamond-containing concretions, it will be appreciated that the invention is not intended to be limited to these examples, and that all diamonded compositions can prove suitable provided that one surface of such a composition can be lapped against another surface of the same nature in order to arrive at the absence of wear. It is furthermore possible to carry out a part of the lapping on surfaces of different compositions, lapping between the surfaces of a bearing of the same nature or of different nature having taken place by finishing the lapping or by effecting the actual lapping.

Thus, as a generality, while the two diamonded surfaces are lapped against one another in the final stages of lapping, in the initial stages of lapping the surfaces may be lapped independently of one another or may be lapped against one another.

By way of example, the diamond-containing concretions referred to in U.S. Pat. No. 3,696,875, the disclosure of which is hereby incorporated by reference, may be used for one or both of the diamonded surfaces.

What is claimed is:

1. A drilling turbine, comprising; a pair of surfaces adapted to be in sliding contact with one another, each said surface comprising a lapped diamonded surface, one of said surfaces being provided on a ring fixed to a rotor of said drilling turbine, the other said surface being fixed to a ring of a stator of said drilling turbine, said diamonded surface of one of said rings engaging said diamonded surface of the other of said rings.

2. A drilling turbine as claimed in claim 1, wherein said diamonded surface of said stator comprises shoes made of a diamond-containing concretion.

3. A drilling turbine as claimed in claim 2, wherein said concretion comprises diamonds inset in a sintered mass containing at least one metallic carbide.

4. An antifriction device for a drilling turbine comprising; a pair of surfaces adapted to be in sliding contact with one another, each said surface comprising a lapped, diamonded surface, wherein each of said diamonded surfaces consists of a concretion of diamonds sunk in a sintered mass consisting of at least one metallic carbide and one metal.

5. An anti-friction device comprising: a pair of surfaces adapted to be in sliding contact with one another, each said surface comprising a lapped, diamonded surface, wherein each of said diamonded surfaces consists of a diamond-containing concretion sunk in a sintered mass consisting of at least one metallic carbide and one metal.

6. A drilling turbine, comprising; a stator provided with an annular support member, a series of shoes disposed on said support member, a rotor provided with a circular support, and a ring fixed to said support, said shoes and said ring together constituting a bearing member for said turbine, said shoes and said ring each comprising a diamond containing concretion having a lapped, diamonded surface.

7. A drilling turbine as claimed in claim 6, further comprising a further bearing mounted on a radially inner surface of said support member, said further bearing opposing a cylindrical surface of said rotor, said cylindrical surface being a diamonded surface.

8. A drilling turbine as claimed in claim 6, further comprising cooling fluid circulating between said shoes and said ring, said cooling fluid comprising drilling sludge.

9. An anti-friction device for use in a drilling turbine, comprising a pair of opposed surfaces arranged in sliding contact with one another, each of said surfaces comprising lapped diamond containing concretions, and a cooling fluid circulating between the opposed surfaces, said cooling fluid comprising drilling mud.

10. An anti-friction device comprising: a pair of surfaces adapted to be in sliding contact with one another, each said surface comprising a lapped, diamonded surface, wherein each of said diamonded surfaces consists of a diamond-containing concretion, and cooling fluid circulating between said surfaces, said cooling fluid comprising drilling sludge.

* * * * *